(12) United States Patent
Harada et al.

(10) Patent No.: US 7,462,023 B2
(45) Date of Patent: Dec. 9, 2008

(54) COMPRESSIVE MOLDING MACHINE FOR POWDER MATERIAL

(75) Inventors: Kenji Harada, Kyoto (JP); Hitoshi Kusunoki, Kyoto (JP)

(73) Assignee: Kikusui Seisakusho Ltd., Kyoto (JP)

( * ) Notice: Subject to any disclaimer, the term of this patent is extended or adjusted under 35 U.S.C. 154(b) by 243 days.

(21) Appl. No.: 11/319,651

(22) Filed: Dec. 29, 2005

(65) Prior Publication Data

US 2006/0147574 A1    Jul. 6, 2006

(30) Foreign Application Priority Data

Jan. 5, 2005    (JP) .................... P2005-000448
Oct. 27, 2005    (JP) .................... P2005-312169

(51) Int. Cl.
  B29C 43/08    (2006.01)
  B30B 11/10   (2006.01)

(52) U.S. Cl. .................... 425/107; 425/215; 425/345

(58) Field of Classification Search .................... 425/78, 425/90, 107, 345, 215, 217, 348 R, 351
See application file for complete search history.

(56) References Cited

U.S. PATENT DOCUMENTS 3,779,305 A * 12/1973 Pondelicek et al. ......... 164/312
5,462,427 A * 10/1995 Kramer ...................... 425/345
6,866,493 B2 * 3/2005 Trebbi et al. ................ 425/107
6,884,054 B2 * 4/2005 Shimada .................... 425/107
2003/0054063 A1   3/2003 Trebbi et al.
2004/0007832 A1   1/2004 Iwano

FOREIGN PATENT DOCUMENTS

| DE | 35 00 429 A1 | 8/1985 |
| EP | 0 545 545 A | 6/1993 |
| JP | 55-41439 | 9/1980 |
| JP | 2001-105195 A | 4/2001 |

* cited by examiner

*Primary Examiner*—Yogendra Gupta
*Assistant Examiner*—Thu Khanh T Nguyen
(74) *Attorney, Agent, or Firm*—Westerman, Hattori, Daniels & Adrian, LLP.

(57) ABSTRACT

An compressive molding machine for powder material comprises an upper punch dust-proof unit 6 that surrounds a sliding part 31 of an upper punch 3 and that has expandable elasticity, and an upper seal that is arranged at a lower end portion of an upper punch holding bore 12x holding the upper punch 3 on a rotary turret 1 and that holds the upper punch 3 slidably and air-tightly, and is further provided with a communicating means 81y that makes inside of the upper punch dust-proof unit 6 communicate with outside of the upper punch dust-proof unit 6 at a time when the upper punch dust-proof unit 6 makes an abutting contact with a portion near a circumference of the upper seal 7.

12 Claims, 6 Drawing Sheets

COMPRESSIVE MOLDING MACHINE FOR POWDER MATERIAL

BACKGROUND OF THE INVENTION AND RELATED ART STATEMENT

This invention relates to a compressive molding machine for powder material in order to mold tablets for medical purpose or the like by compressing powder material.

Conventionally, in a compressive molding machine for powder material to fill powder material into a die and to compressively mold the powder material by the use of an upper punch and a lower punch inserted into the die, the powder material might splash and the splashed powder material might attach to the upper punch or the inside of an upper punch holding bore that holds the upper punch during, for example, a process of scraping the powder material after the powder material is filled into the die, or a process of compressively molding the powder material in the die with the upper punch and the lower punch. If the powder material attaches to the upper punch, a problem might occur that the attached powder material is mixed with lubricant applied to the upper punch, the mixture of the powder material and the lubricant becomes a lump and drops, and the mixture mixes into the powder material to be molded. In addition, if the powder material attaches to the inside of the upper punch holding bore, a problem might occur that the powder material is mixed with lubricant applied to the inside of the upper punch holding bore, the mixture of the powder material and the lubricant becomes a lump and drops and the mixture mixes into the powder material to be molded, or a problem might occur that the lumped mixture gets stuck inside the upper punch holding bore, which requires a troublesome labor of cleaning the inside of the upper punch holding bore. In order to prevent these problems, an arrangement is conceived that an upper punch dust-proof unit having an expandably elastic bellows part that surrounds a sliding part of the upper punch and whose upper end makes an abutting contact with the rotary turret is mounted. In the upper punch dust-proof unit having the bellows part, an arrangement of making the inside of the bellows part communicate with the outside of the bellows part is conceived that an air vent groove that is communicated with the upper punch holding bore and that extends along the upper punch holding bore is arranged in order to make it possible to interchange air between the inside of the bellows part and the outside thereof at a time that the bellows part is compressed to be shortened or extended. (For example, refer to a patent document 1) Patent document 1: Japanese Utility Model Publication No. SHO55-41439

At a time when the bellows part fails to extend with following a downward movement of the upper punch and the powder material might enter inside of the upper punch holding bore from a gap formed above the bellows part through the air vent groove. At this time, in case that an air vent groove that is communicated with the upper punch holding bore and that extends along the upper punch holding bore is arranged as the arrangement described in the patent document 1, a problem might occur that the powder material entering inside of the upper punch holding bore is mixed with lubricant applied to the inside of the upper punch holding bore and the mixture of the powder material and the lubricant gets stuck inside of the upper punch holding bore or the air vent groove, which increases a troublesome labor of cleaning inside of the upper punch holding bore or the air vent groove. Furthermore, if the mixture of the powder material and the lubricant gets stuck inside of the upper punch holding bore, the upper punch might be grated, which puts a heavy load on a guide rail that guides the upper punch vertically. As a result of this, problems might occur that a life of the guide rail is shortened or the guide rail is broken. In addition, a problem might occur that the powder material entering the upper punch holding bore or the air vent groove passes the upper punch holding bore and attaches to a head portion of the upper punch or the guide rail that makes an abutting contact with the head portion of the upper punch and that guides the upper punch upward slidably.

The present claimed invention intends to solve the above problems.

SUMMARY OF THE INVENTION

The compressive molding machine for powder material in accordance with this invention comprises an upper punch dust-proof unit that surrounds a sliding part of an upper punch and that has expandable elasticity, and an upper seal that is arranged at a lower end portion of an upper punch holding bore holding the upper punch on a rotary turret and that holds the upper punch slidably and air-tightly, and a communicating means that makes inside of the upper punch dust-proof unit communicate with outside of the upper punch dust-proof unit at a time when the upper punch dust-proof unit makes an abutting contact with a portion near a circumference of the upper seal is arranged.

In accordance with this arrangement, since the upper seal holds the upper punch slidably and air-tightly and the communicating means makes the inside of the upper punch dust-proof unit communicate with the outside of the upper punch dust-proof unit at a time when the upper punch dust-proof unit makes an abutting contact with a portion near the circumference of the upper seal, it is possible to discharge air inside the upper punch dust-proof unit to outside of the upper punch dust-proof unit through the communicating means and to keep the portion above the upper seal in the upper punch holding bore air-tight at the time when the upper punch dust-proof unit makes an abutting contact with a portion near the circumference of the upper seal. More specifically, it is possible to prevent problems that result from the powder material entering the inside of the upper punch holding bore, mixed with the lubricant applied to the upper punch holding bore and then getting stuck inside of the upper punch holding bore, namely a problem of increasing a troublesome labor of cleaning inside of the upper punch holding bore, a problem of putting a heavy load on the guide rail, and a problem of attaching the powder material passing the upper punch holding bore to the head portion of the upper punch or the guide rail that makes an abutting contact with the head portion of the upper punch and that guides the upper punch upward slidably.

Especially, if the communicating means is formed at a side of the rotary turret, there is no need of arranging an opening as the communicating means at a side face of the upper punch dust-proof unit. As a result, it is possible to secure a longer operating life and strength for the upper punch dust-proof unit even though the upper punch dust-proof unit is in a shape of a thin bellows.

As an arrangement to further effectively prevent a problem that the powder material mixed with the lubricant mixes into the powder material to be molded represented is that the communicating means is formed as a groove extending outside of the rotary turret. In accordance with this arrangement, the powder material mixed into air in the upper punch dust-proof unit flies toward a direction outside of the rotary turret together with air through the groove as being the communicating means.

As an arrangement to improve workability of attaching or detaching the upper seal represented is that an upper seal case integrally having a seal plate that supports the upper seal, an engaging projection that can make an engagement with an annular groove formed on the rotary turret, and a connecting part that connects an outer edge portion of the seal plate and the engaging projection is arranged on the rotary turret. In accordance with this arrangement, it is possible not only to dismount the upper seal with operations of dismounting the upper seal case from the rotary turret by releasing engagement of the annular groove and the engaging projection and of dismounting the upper seal from the upper seal case, but also to mount the upper seal on the rotary turret with a backward process to dismount the upper seal from the rotary turret.

In addition, as an arrangement to make it easy to slide the upper punch vertically and to secure an effect of preventing the powder material mixed into the air in the space below the upper seal from entering the space above the upper seal represented is that the upper seal has an abutting tongue that extends downward and whose distal end portion alone makes an abutting contact with the upper punch. In accordance with this arrangement, since the abutting tongue alone makes an abutting contact with the upper punch, a contact area of the upper punch with the upper seal can be decreased. In addition, since the abutting tongue extends downward and whose distal end portion elastically makes an abutting contact with the upper punch, it is possible to secure air-tightness of the space above the upper seal.

Since the compressive molding machine for powder material in accordance with the present claimed invention comprises the upper seal that holds the upper punch slidably and air-tightly, and the communicating means that makes the inside of the upper punch dust-proof unit communicate with the outside of the upper punch dust-proof unit at a time when the upper punch dust-proof unit that surrounds the sliding part of the upper punch and that has expandable elasticity makes an abutting contact with a portion near the circumference of the upper seal, it is extremely difficult for the powder material to enter the space above the upper seal in the upper punch holding bore, which enables to considerably reduce a troublesome labor of cleaning the inside of the upper punch holding bore, the head portion of the upper punch and the guide rail.

DETAILED DESCRIPTION OF THE PREFERRED EMBODIMENTS

This invention will be described in detail with reference to an embodiment thereof shown in the accompanying drawings.

Figure 1:
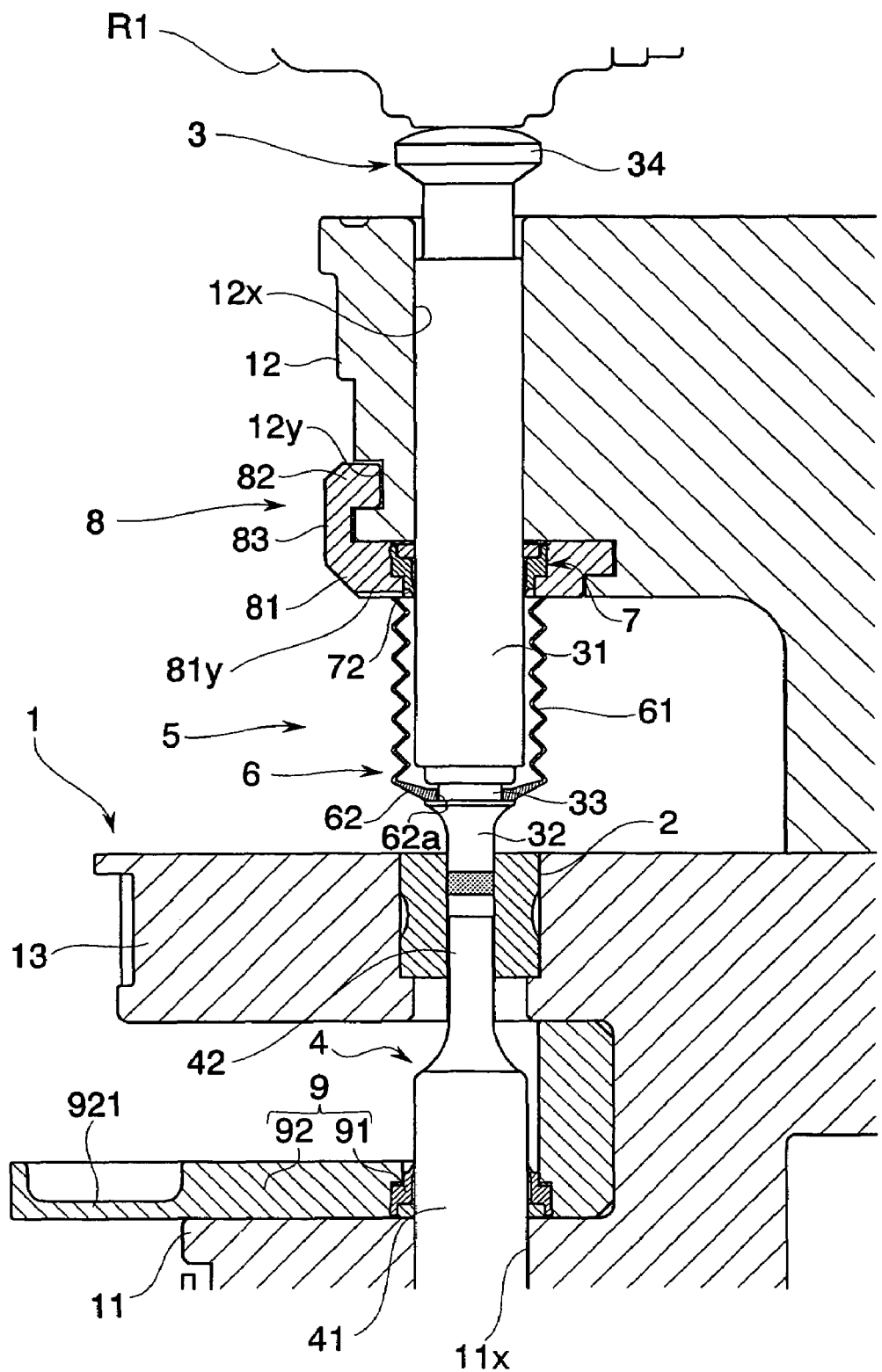
FIG. 1 is a cross-sectional view of a compressive molding machine for powder material in accordance with one embodiment of the present claimed invention.
Figure 2:
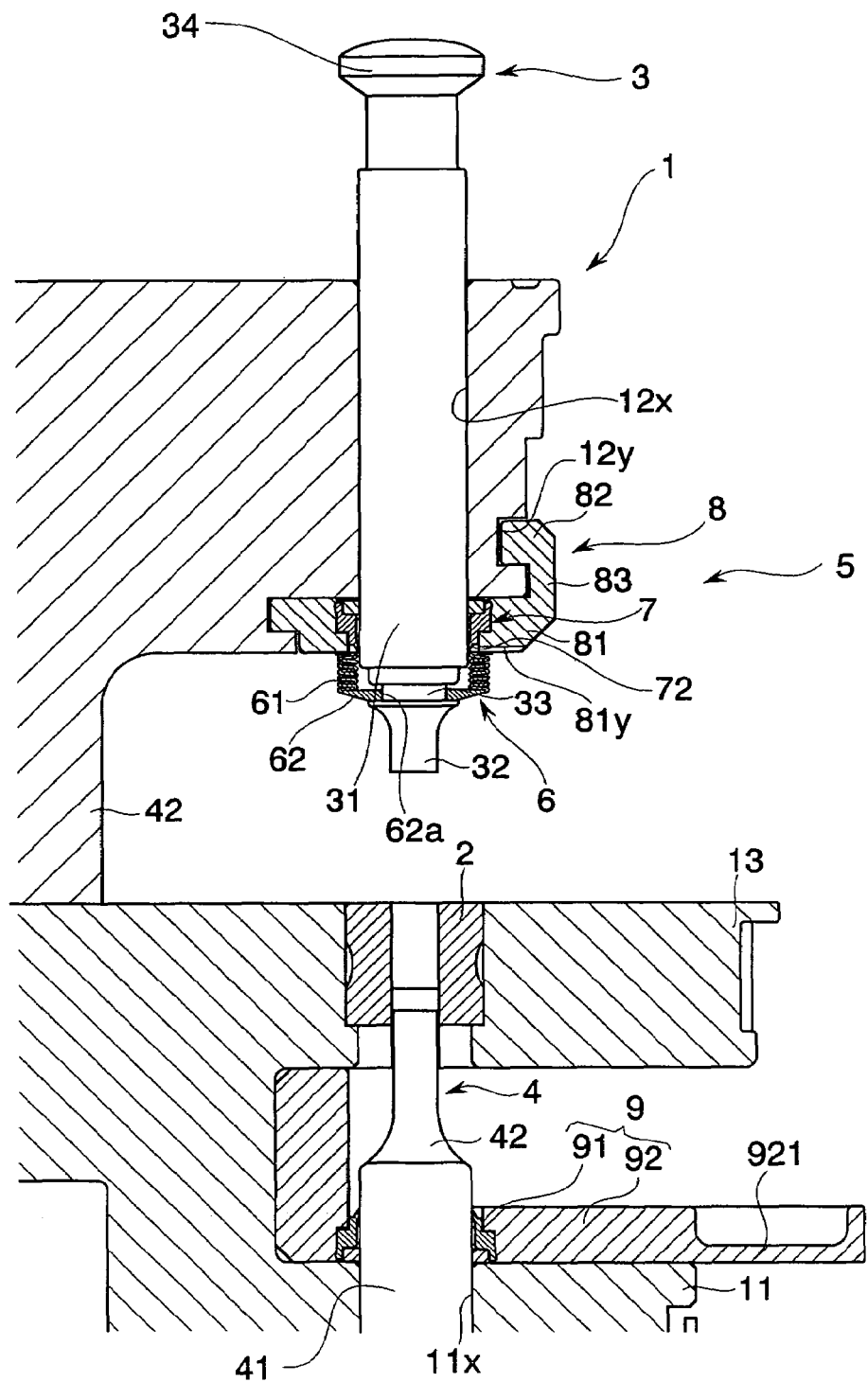
FIG. 2 is a cross-sectional view of a principal part of the compressive molding machine for powder material in accordance with this embodiment.

A compressive molding machine for powder material (herein after called as a molding machine) in accordance with this embodiment is, as shown in FIG. 1 and FIG. 2, so arranged that a rotary turret 1 is horizontally rotatably arranged in a frame (omitted to be shown in the drawings) through an upright shaft (omitted to be shown in the drawings), pluralities of dies 2 are arranged on the rotary turret 1 at a predetermined pitch, and an upper punch holding bore $12x$ and a lower punch holding bore $11x$ are arranged on an upper portion and a lower portion of each die 2 respectively on the rotary turret 1. The molding machine compressively molds powder material filled in the die 2 with the upper punch 3 whose tip part 32 is inserted into the die 2 and the lower punch 4 whose tip part 42 is inserted into the die 2 passing between an upper compression roller R1 and a lower compression roller (omitted to be shown in the drawings). In addition, in this embodiment, a powder material attaching-proof unit 5 is arranged in order to prevent the powder material from attaching to the upper punch 3 and inside of the upper punch holding bore $12x$.

The rotary turret 1 comprises, as shown in FIG. 1 and FIG. 2, a lower punch holding part 11 that is arranged at a lower portion of the rotary turret 1 and that holds the lower punch 4 in a vertically slidable manner inside the lower punch holding bore $11x$, an upper punch holding part 12 that is arranged at an upper portion of the rotary turret 1 and that holds the upper punch 3 in a vertically slidable manner inside the upper punch holding bore $12x$, and a die holding part 13 that is arranged between the upper punch holding part 12 and the lower punch holding part 11 and that mounts the die 2 detachably. In addition, a guide rail (omitted to be shown in drawings) is arranged on a circumference of the rotary turret 1 and the upper punch 3 is slidably guided to make an up and down movement by making a head portion 34 of the upper punch 3 abutting contact with the guide rail (omitted to be shown in drawings).

Figure 3:
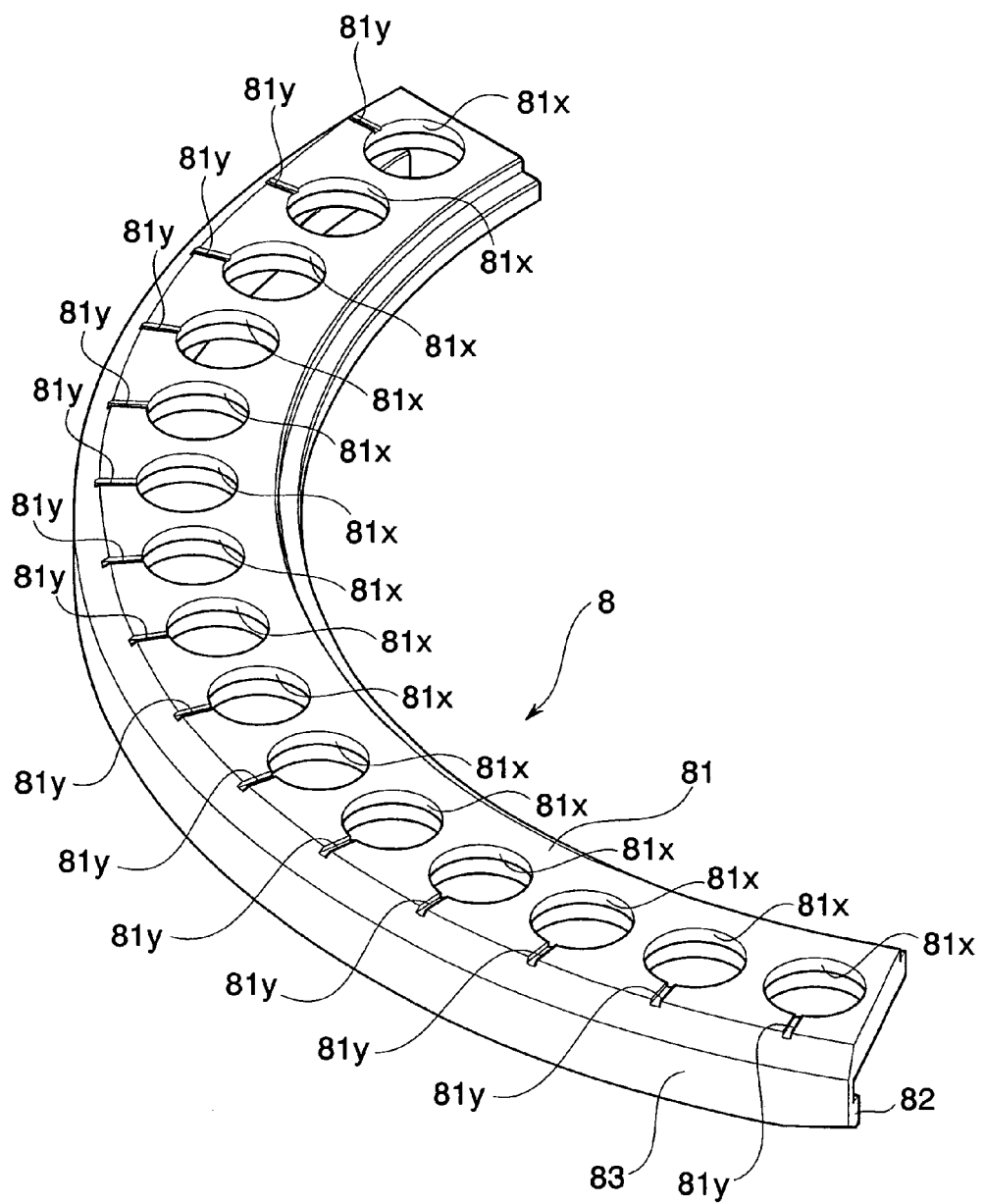
FIG. 3 is an overall perspective view of an upper seal case in accordance with this embodiment.
Figure 4:
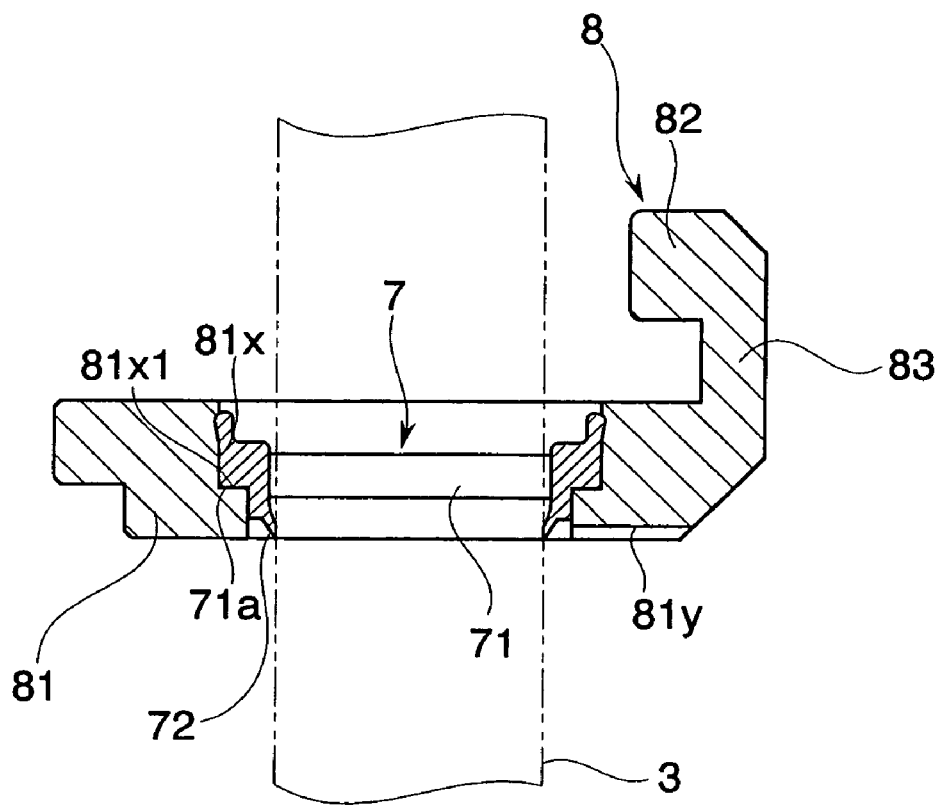
FIG. 4 is a longitudinal cross-sectional view of the upper seal case in a state of holding an upper seal in accordance with this embodiment.

The powder material attaching-proof unit 5 comprises an upper punch dust-proof unit 6 that is made of, for example, rubber having elasticity such as silicon rubber, an upper seal 7 that is mounted on the lower end portion of the upper punch holding bore $12x$ in order to prevent excessive powder material generating at a time when the powder material is compressively molded from entering the upper punch holding bore $12x$, and an upper seal case 8 that is mounted on the lower face of the upper punch holding part 12 in an abutted state and that supports the upper seal 7 with its center locating on the same straight line as that of the upper punch 3. An overall perspective view of the upper seal case 8 is shown in FIG. 3 and a longitudinal cross-sectional view of a state wherein the upper seal 7 is held by the upper seal case 8 is shown in FIG. 4. The upper punch 3 is shown by an imaginary line in FIG. 4.

The upper punch dust-proof unit 6 has an elastically expandable bellows part 61 of a cylindrical shape that surrounds the sliding part 31 of the upper punch 3 and an engaging part 62 that is integrally formed with the bellows part 61 at a lower end of the bellows part 61 and that elastically makes an engagement with the upper punch 3.

The bellows part 61 is formed, as shown in FIG. 1, to have a length to surround an exposed portion of the sliding part 31 of the upper punch 3 projecting from the upper punch holding part 12 of the rotary turret 1 at a time when the upper punch 3 makes an up and down movement slidably in a condition of being held by the rotary turret 1. In addition, an inside diameter of the upper end of the bellows part 61 is made to be larger than an outside diameter of the upper seal 7.

The engaging part 62 is thicker than the bellows part 61 and has an engaging edge $62a$ that makes an engagement with an annular groove 33 arranged between the sliding part 31 and the tip part 32 of the upper punch 3. The engaging part 62 is made to be more rigid than the bellows part 61 by forming the engaging part 62 thicker than the bellows part 61 even though the engaging part 62 is made of the same material as that of the bellows part 61. The engaging edge 62a has an inside diameter generally the same as that of the annular groove 33 of the upper punch 3. In addition, in this embodiment, it is so set that the upper end of the bellows part 61 makes an abutting contact with a lower surface of the upper punch holding part 12, more accurately a lower surface of the upper seal case 8 at least in a state that the upper punch 3 is raised the most.

Whole of the upper seal 7 is made of an elastic member, for example, rubber, and air-tightly surrounds the upper punch 3 in a slidable manner. In addition, as shown in FIG. 1, FIG. 2 and FIG. 4, a downward facing surface 71a of the upper seal 7 makes an abutting contact with the upper seal case 8 and the upper seal 7 has an annular mounting part 71 and an abutting tongue 72 that extends downward from a lower end of the mounting part 71 and whose distal end portion makes an abutting contact with the upper punch 3. The upper seal 7 is so formed that only the abutting tongue 72 of the upper seal 7 makes an elastic abutting contact with the upper punch 3.

The upper seal case 8 is made by cutting, for example, an aluminum material and in a sector form with an inner angle of, for example, 120 degrees in a plane view, as shown in FIG. 3 and FIG. 4. Three pieces of the upper seal cases 8 are arranged continuously to form an annular shape to surround an outer circumference of the rotary turret 1 so as to arrange the upper seal 7 to every upper punch 3. Each of the upper seal case 8 is integrally provided with a seal plate 81 having a seal holding bore 81x that supports the upper seal 7 with the same pitch as that of the die 2, an engaging projection 82 that can make an engagement with an annular groove 12y formed on the upper punch holding part 12 and a connecting part 83 that connects an outer edge part of the seal plate 81 with the engaging projection 82. A counter boring part 81x1 that can make an abutting contact with a downward facing surface 71a formed on the mounting part 71 of the upper seal 7 is formed on the seal holding bore 81x, and the upper seal 7 is held by the upper seal case 8 in a state wherein the counter boring part 81x1 makes an abutting contact with the downward facing surface 71a of the upper seal 7. In addition, the upper seal case 8 is mounted on the rotary turret 1 with the engaging projection 82 engaging the annular groove 12y in a state of holding the upper seal 7 and dismounted from the rotary turret 1 with releasing the engaging projection 82 from an engagement with the annular groove 12y. In this embodiment, the upper punch 3 sometimes rotates at a time of making a vertical movement or at a time of compressive molding. Then, the upper punch dust-proof unit 6 follows the movement of the upper punch 3 and rotates. At this time, a big frictional force generates at a portion where the upper punch dust-proof unit 6 makes an abutting contact with the upper seal case 8. In order to prevent a problem that the upper punch dust-proof unit 6 is twisted or broken, the under surface of the upper seal case 8 is provided with a surface treatment of fluoroethylene resin impregnation. In addition, the problem that the upper punch dust-proof unit 6 is twisted or broken may be prevented by the use of other method such as a method to form whole of the upper seal case 8 made of resin, or a method to lie a ring of fluoroethylene resin between an upper end of the upper punch dust-proof unit 6 and an under surface of the upper seal case 8.

Furthermore, in this embodiment, a lower punch dust-proof unit 9 having a lower seal 91 that surrounds the lower punch 4 slidably and airtightly and a lower seal case 92 that supports the lower seal 91 with the same pitch as that of the die 2 is further provided to prevent the powder material from attaching to the sliding part 41 of the lower punch 4. In addition, a powder receiver 921 is integrally formed with the lower seal case 92 in order to prevent the powder material from spilling out of the rotary turret 1.

In this embodiment, as shown in FIG. 1 through FIG. 4, a communicating groove 81y as being a communicating means that makes inside of the upper punch dust-proof unit 6 communicate with outside of the upper punch dust-proof unit 6 is formed at a portion both near a position where the bellows part 61 makes an abutting contact with the upper seal case 8, more concretely, near a position where the bellows part 61 makes an abutting contact with the seal holding bore 81x and below of the upper seal 7 in order to makes it possible to make inside of the upper punch dust-proof unit 6 communicate with outside of the upper punch dust-proof unit 6 so as to exhaust air at a time when the bellows part 61 is compressed to be shortened and the upper end of the upper punch dust-proof unit 6, more concretely the upper end of the bellows part 61 makes an abutting contact with a portion near a circumference of the upper seal 7 of the upper seal case 8. More specifically, the communicating groove 81y is arranged on an under surface of the upper seal case 8 to communicate with the seal holding bore 81x with extending from a center of the seal holding bore 81x toward a direction outside of the rotary turret 1. Since an inside diameter of the upper end of the bellows part 61 is made larger than an outside diameter of the upper seal 7, the communicating groove 81y makes inside of the upper punch dust-proof unit 6 communicate with outside of the upper punch dust-proof unit 6 at a time when the upper end of the upper punch dust-proof unit 6, namely the upper end of the bellows part 61 makes an abutting contact with the portion near the circumference the upper seal 7 of the upper seal case 8. More specifically, in this embodiment, the communicating groove 81y makes inside of the upper punch dust-proof unit 6 communicate with outside of the upper punch dust-proof unit 7 selectively at a time when the upper end of the upper punch dust-proof unit 6, namely the upper end of the bellows part 61 makes an abutting contact with the portion near the circumference of the upper seal 7 of the upper seal case 8.

In accordance with this arrangement, in case of compressing the powder material filled in the die 2, as shown in FIG. 1, the upper punch 3 is in a state that the sliding part 31 projects out of the upper punch holding part 12 of the rotary turret 1 and the upper punch dust-proof unit 6 is kept in a condition of not being compressed at all, namely a condition prior to being compressed to be shortened. In this state, a length of the bellows part 61 is kept approximately the same as the length of the bellows part 61 when it was manufactured.

The upper punch 3 moves upward in case of taking a molded product out of the die 2 or filling the powder material into the die 2 after completion of compressive molding the powder material by the upper punch 3 and the lower punch 4. More specifically, the upper punch 3 moves upward, as shown in FIG. 2, until the sliding part 31 of the upper punch 3 is generally stored inside the upper punch holding part 12 of the rotary turret 1. As mentioned above, the upper punch 3 is slidably guided to move upward by the guide rail (omitted to be shown in drawings). Accordingly, the bellows part 61 of the upper punch dust-proof unit 6 is also compressed to be shortened.

Then the abutting tongue 72 of the upper seal 7 elastically makes an abutting contact with the upper punch 3 so that the powder material mixed into the air and going over the abutting tongue 72 is prevented from entering inside the upper punch holding bore 12x. In addition, the air inside the upper punch dust-proof unit 6 is exhausted from the communicating groove 81y to outside of the upper punch dust-proof unit 6 when the upper punch 3 moves upward. As a result of this, a portion above the abutting tongue 72 in the upper punch holding bore 12x is kept airtight. When the upper punch 3 moves upward, the bellows part 61 of the upper punch dust-proof unit 6 is extended from a shortened state so as to be restored to a state prior to being compressed to be shortened due to elasticity of the bellows part 61. However, a gap might be formed between the upper end of the upper punch dust-proof unit 6 and the upper seal case 8 because a speed that the bellows part 61 stretches is slower than a speed that the upper punch 3 moves upward. In spite of this, since the abutting tongue 72 of the upper seal 7 elastically makes an abutting contact with the upper punch 3, the abutting tongue 72 functions to prevent the powder material mixed into the air from entering inside the upper punch holding bore 12x and in this case also, the portion above the abutting tongue 72 in the upper punch holding bore 12x is kept airtight.

Since the molding machine in accordance with this embodiment has the above-mentioned arrangement, more specifically, comprises the upper punch dust-proof unit 6 that surrounds the sliding part 31 of the upper punch 3 and that has expandable elasticity, and the upper seal 7 that is arranged at the lower end portion of the upper punch holding bore 12x holding the upper punch 3 of the rotary turret 1 and that holds the upper punch 3 slidably and air-tightly, and in addition to this, the communicating groove 81y that makes inside of the upper punch dust-proof unit 6 communicate with outside of the upper punch dust-proof unit 6 at a time when the upper end of the upper punch dust-proof unit 6 makes an abutting contact with the portion near the circumference of the upper seal 7 of the upper seal case 8 is provided, following effects can be obtained. More specifically, in case that the upper punch 3 moves upward, namely the upper punch dust-proof unit 6 is compressed to be shortened, the air inside of the upper punch dust-proof unit 6 is exhausted to outside of the upper punch dust-proof unit 6 through the communicating groove 81y and the portion above the upper seal 7 in the upper punch holding bore 12x can be kept airtight. As a result, it is possible to prevent a problem that a labor hour of cleaning the upper punch holding bore 12x increases because the powder material enters the inside of the upper punch holding bore 12x and the entered powder material mixed with lubricant applied to the upper punch holding bore 12x gets stuck to the inside of the upper punch holding bore 12x or a problem resulting from the powder material that passes the upper punch holding bore 12 and attaches to a head part 34 of the upper punch 3 or the guide rail (omitted to be shown in drawings).

In addition, since the communicating groove 81y is formed on the upper seal case 8, namely at a side of the rotary turret 1, there is no need of providing an opening for inhaling or exhausting air at a side face of the upper punch dust-proof unit 6, and a longer operating life and strength can be secured for the upper punch dust-proof unit 6 even though it is in a shape of a thin bellows.

Furthermore, since the communicating groove 81y extends toward an outside of the rotary turret 1, the powder material in the upper punch dust-proof unit 6 flies toward the outside of the rotary turret 1 together with air. As a result, a problem that the powder material mixed with the lubricant enters the die 2 can be furthermore effectively prevented.

In addition, since the upper seal case 8 having the seal plate 81 that supports the upper seal 7, the engaging projection 82 that can make an engagement with the annular groove 12y formed on the rotary turret 1 and the connecting part 83 that connects the outer edge portion of the seal plate 81 with the engaging projection 82, each of which is integrally formed, is arranged on the rotary turret 1, the upper seal 7 can be dismounted from the upper seal case 8 with operations of releasing engagement of the annular groove 12y with the engaging projection 82 and dismounting the upper seal case 8 from the rotary turret 1, and the upper seal 8 can be mounted on the upper seal case 8 with operations in a reverse way of dismounting the upper seal 7. As a result, workability of mounting and dismounting the upper seal 7 can be improved compared with a case of mounting the upper seal 7 on the rotary turret 1 directly.

Since the upper seal 7 has the abutting tongue 72 that extends downward and the distal end of which makes an abutting contact with the upper punch 3 and the abutting tongue 72 alone elastically makes an abutting contact with the upper punch 3, a contact area of the upper punch 3 with the upper seal 7 can be lessened, thereby making it easy for the upper punch 3 to make a vertical sliding movement. In addition, the abutting tongue 72 makes an abutting contact with the upper punch 3 and the space above the upper seal 7 is secured to be airtightly sealed. As a result of this, it is possible to secure an effect of preventing the powder material mixed into the air from entering the space from the space below the upper seal 7 to the space above the upper seal 7.

The present claimed invention is not limited to the above embodiment.

Figure 5:
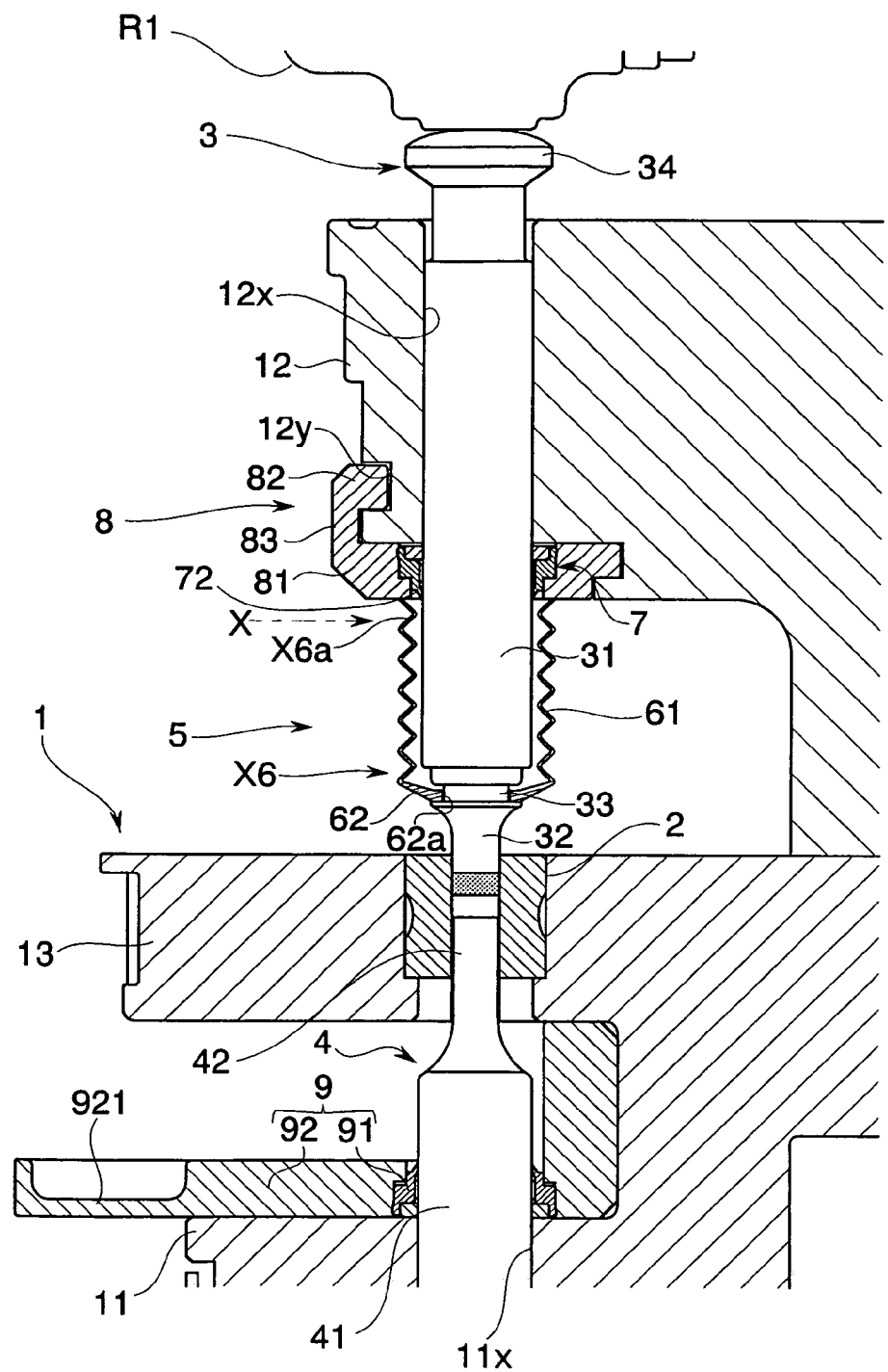
FIG. 5 is a cross-sectional view of a compressive molding machine for powder material in accordance with other embodiment of the present claimed invention.
Figure 6:
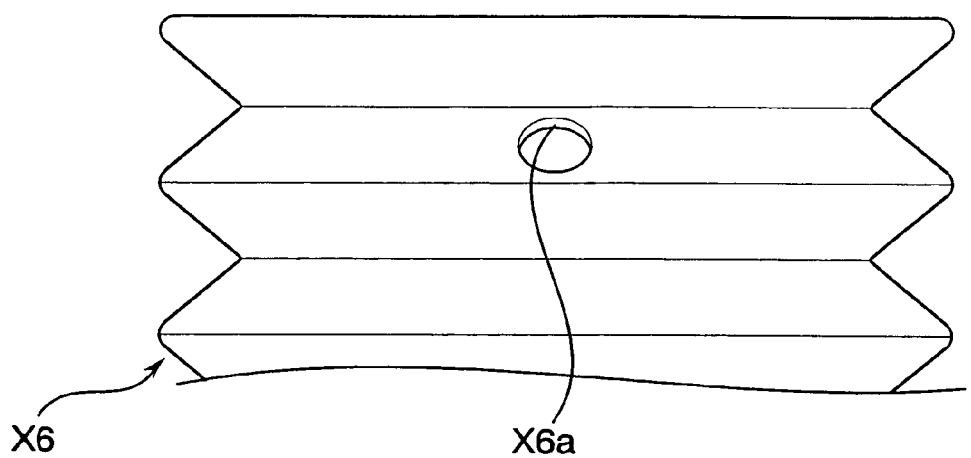
FIG. 6 is a magnified view of the upper end portion of the upper punch dust-proof unit and its adjacent portion viewed from a direction of an arrow X in FIG. 5.

For example, an arrangement corresponding to FIG. 1 in the above-mentioned embodiment may adopt an arrangement shown in FIG. 5. In this arrangement, in stead of the upper punch dust-proof unit 6 in the above-mentioned embodiment, used is an upper punch dust-proof unit X6 wherein an intake/exhaust opening X6a as being the communicating means is provided at an upper end portion of the upper punch dust-proof unit X6 or its neighbor. FIG. 6 shows a magnified view of the upper end portion and its neighbor of the upper punch dust-proof unit X6 viewed from a direction of an arrow X in FIG. 5. In this arrangement, the communicating groove 81y as being the communicating means arranged in the above embodiment is omitted. In accordance with this arrangement, it is possible to obtain an effect that the powder material mixed into the air inside the upper punch dust-proof unit X6 can be exhausted outside through the intake/exhaust opening X6a. In this case, since it is possible to manufacture the upper punch dust-proof unit X6 having the intake/exhaust opening X6a with a molding forming, a process to arrange an opening can be skipped. In addition, a process to form a communicating groove also can be skipped. More specifically, a process to form the communicating means can be omitted, thereby to reduce a number of processing to manufacture the compressive molding machine for powder material by making use of the upper punch dust-proof unit X6.

In addition, the upper seal case may be omitted and the upper seal may be directly mounted on the rotary turret. With this arrangement, if a communicating groove extending from a portion where the upper seal makes an abutting contact with the inside of the upper punch dust-proof unit of the rotary turret to outside of the rotary turret is formed as the communicating means, it is possible to obtain an effect that the powder material can be exhausted from the communicating groove as being the communicating means to the outside.

Furthermore, with an arrangement wherein the upper end portion of the upper punch dust-proof unit always makes an abutting contact with the lower face of the rotary turret, if a communicating means of, for example, the same arrangement as that of the communicating groove 81y in the above-mentioned embodiment that makes the inside of the upper punch dust-proof unit communicate with the outside of the upper punch dust-proof unit is provided near the upper end portion of the upper punch dust-proof unit, it is possible to obtain an effect that the portion above the upper seal of the upper punch holding bore can be kept airtightly and the powder material is prevented from entering the portion.

In addition, with an arrangement wherein a key is arranged on the upper punch in order to prevent the upper punch from rotating and a key groove that can make an engagement with the key of the upper punch is arranged on the rotary turret and that is communicated with the upper punch holding bore, the key groove can be kept airtightly if whole of the key groove locates above the upper seal, the upper seal is arranged at the lower end portion of the upper punch holding bore and a communicating means that makes inside of the upper punch dust-proof unit communicate with outside of the upper punch dust-proof unit at a time when the upper punch dust-proof unit makes an abutting contact with a portion near a circumference of the upper seal is arranged. As a result, it is possible to avoid a problem that the powder material mixed with lubricant attaches to the inside of the key groove.

A shape of the upper seal may be variously modified. For example, the upper seal may be of a shape that a lower abutting tongue extending downward and an upper abutting tongue extending upward are arranged wherein the lower abutting tongue and the upper abutting tongue elastically make an abutting contact with the upper punch, or of a shape that a cylindrical abutting part to the upper punch is formed at the bottom portion of the upper seal wherein whole inside face of the abutting part to the upper punch makes an abutting contact with the upper punch.

In addition, if a powder material sucking unit that sucks and removes splashed powder material is arranged near a portion where the powder material is scraped, it is possible to effectively avoid problems that the powder material mixed with grease drops on the rotary turret, the powder material mixed with grease attaches to the inside of the upper punch holding bore or the powder material mixed with grease attaches to the guide rail guiding the upper punch slidably and vertically.

The invention claimed is:

1. A compressive molding machine for powder material comprising an upper punch dust-proof unit that surrounds a sliding part of an upper punch and that has expandable elasticity, and an upper seal that is arranged at a lower end portion of an upper punch holding bore holding the upper punch on a rotary turret and that holds the upper punch slidably and air-tightly, and characterized by arranging a communicating means located between the upper dust-proof unit and the upper seal that makes an inside of the upper punch dust-proof unit communicate with an outside of the upper punch dust-proof unit to an area comprising a die at a time when the upper punch dust-proof unit makes an abutting contact with a portion near a circumference of the upper seal.

2. The compressive molding machine for powder material described in claim 1, and characterized by that the communicating means is formed at a side of the rotary turret.

3. The compressive molding machine for powder material described in claim 2, and characterized by that the communicating means is formed as a groove extending outside of the rotary turret.

4. The compressive molding machine for powder material described in claim 1, and characterized by that the rotary turret is provided with an upper seal case integrally having a seal plate that supports the upper seal, an engaging projection that can make an engagement with an annular groove formed on the rotary turret, and a connecting part that connects an outer edge portion of the seal plate and the engaging projection.

5. The compressive molding machine for powder material described in claim 2, and characterized by that the rotary turret is provided with an upper seal case integrally having a seal plate that supports the upper seal, an engaging projection that can make an engagement with an annular groove formed on the rotary turret, and a connecting part that connects an outer edge portion of the seal plate and the engaging projection.

6. The compressive molding machine for powder material described in claim 3, and characterized by that the rotary turret is provided with an upper seal case integrally having a seal plate that supports the upper seal, an engaging projection that can make an engagement with an annular groove formed on the rotary turret, and a connecting part that connects an outer edge portion of the seal plate and the engaging projection.

7. The compressive molding machine for powder material described in claim 1, and characterized by that the upper seal has an abutting tongue that extends downward and whose distal end portion alone makes an abutting contact with the upper punch.

8. The compressive molding machine for powder material described in claim 2, and characterized by that the upper seal has an abutting tongue that extends downward and whose distal end portion alone makes an abutting contact with the upper punch.

9. The compressive molding machine for powder material described in claim 3, and characterized by that the upper seal has an abutting tongue that extends downward and whose distal end portion alone makes an abutting contact with the upper punch.

10. The compressive molding machine for powder material described in claim 4, and characterized by that the upper seal has an abutting tongue that extends downward and whose distal end portion alone makes an abutting contact with the upper punch.

11. The compressive molding machine for powder material described in claim 5, and characterized by that the upper seal has an abutting tongue that extends downward and whose distal end portion alone makes an abutting contact with the upper punch.

12. The compressive molding machine for powder material described in claim 6, and characterized by that the upper seal has an abutting tongue that extends downward and whose distal end portion alone makes an abutting contact with the upper punch.

* * * * *